(12) United States Patent
Horikawa

(10) Patent No.: US 7,773,605 B2
(45) Date of Patent: Aug. 10, 2010

(54) MPOA SYSTEM AND ITS SHORTCUT COMMUNICATION CONTROL METHOD, AND SHORTCUT COMMUNICATION CONTROL PROGRAM

(75) Inventor: Koichi Horikawa, Yamanashi (JP)

(73) Assignee: Juniper Networks, Inc., Sunnyvale, CA (US)

( * ) Notice: Subject to any disclaimer, the term of this patent is extended or adjusted under 35 U.S.C. 154(b) by 457 days.

(21) Appl. No.: 11/742,765

(22) Filed: May 1, 2007

(65) Prior Publication Data

US 2007/0201478 A1 Aug. 30, 2007

Related U.S. Application Data

(63) Continuation of application No. 10/160,028, filed on Jun. 4, 2002, now Pat. No. 7,230,950.

(30) Foreign Application Priority Data

Jun. 5, 2001 (JP) ............................ 2001-168988

(51) Int. Cl.
*H04L 12/28* (2006.01)
*H04L 12/56* (2006.01)

(52) U.S. Cl. ............. 370/395.54; 370/392; 370/395.31; 370/395.51; 370/235

(58) Field of Classification Search ............ 370/395.54, 370/392, 235, 395.31, 395.51, 474, 389, 370/467; 709/238
See application file for complete search history.

(56) References Cited

U.S. PATENT DOCUMENTS

| | | | | |
|---|---|---|---|---|
| 6,055,561 A * | 4/2000 | Feldman et al. | ............. | 709/200 |
| 6,178,171 B1 * | 1/2001 | Alexander et al. | ..... | 370/395.54 |
| 6,189,041 B1 * | 2/2001 | Cox et al. | ................... | 709/238 |
| 6,421,321 B1 | 7/2002 | Sakagawa et al. | ........ | 370/238.1 |
| 6,452,921 B1 * | 9/2002 | Alexander et al. | .......... | 370/351 |
| 6,608,817 B1 * | 8/2003 | Ivory | ......................... | 370/250 |
| 6,633,902 B1 * | 10/2003 | Asano et al. | ................ | 709/203 |
| 6,658,001 B1 | 12/2003 | Furuno et al. | ............... | 370/392 |
| 6,711,152 B1 * | 3/2004 | Kalmanek et al. | ........... | 370/351 |
| 6,712,991 B2 | 3/2004 | Gore et al. | .................... | 252/79 |
| 6,747,982 B2 | 6/2004 | Nakatsugawa | .............. | 370/403 |
| 6,760,336 B1 | 7/2004 | Mangin et al. | ......... | 370/395.21 |
| 6,915,349 B1 | 7/2005 | Horikawa | ................... | 709/238 |
| 6,944,675 B2 | 9/2005 | Fujita | ........................ | 709/240 |

(Continued)

FOREIGN PATENT DOCUMENTS

JP 200236879 * 12/2002

*Primary Examiner*—Ayaz R Sheikh
*Assistant Examiner*—Chuong T Ho
(74) *Attorney, Agent, or Firm*—Harrity & Harrity, LLP

(57) ABSTRACT

An MPOA system for establishing communication by using layer 3 protocol on an ATM network, in which data about the layer 3 address of a source of data packets is added to an address resolution request packet which is transmitted in order to establish a shortcut VCC toward a destination of the data packets in each communication node and hence transmitted to the destination, and in the case of accepting the address resolution request packets to be transmitted in order to establish the respective shortcut VCCs toward the destination of the data packets, as for the same communication, from a plurality of the communication nodes, a shortcut VCC is established only between the destination and the communication node remotest from the destination on the network.

12 Claims, 15 Drawing Sheets

U.S. PATENT DOCUMENTS 7,310,683 B2 * 12/2007 Shobatake ................. 709/238
7,327,738 B2 * 2/2008 Luciani et al. ......... 370/395.53
2004/0095947 A1 * 5/2004 Luciani et al. .............. 370/410

* cited by examiner

MPOA SYSTEM AND ITS SHORTCUT COMMUNICATION CONTROL METHOD, AND SHORTCUT COMMUNICATION CONTROL PROGRAM

RELATED APPLICATION

This application is a continuation of U.S. patent application Ser. No. 10/160,028, filed Jun. 4, 2002, which is incorporated herein by reference.

BACKGROUNDS OF THE INVENTION

1. Field of the Invention

The present invention relates to a communication by an MPOA (Multi-Protocol Over ATM) system, and more particularly to an MPOA system capable of avoiding Domino Effect in a shortcut communication and its shortcut communication control method, and a shortcut communication control program.

2. Description of the Related Art

The conventional Multi-Protocol Over ATM (hereinafter, referred to as MPOA) system is a communication system using existing layer 3 (network layer) protocols such as Internet Protocol (hereinafter, referred to as IP), and Internetwork Packet Exchange (hereinafter, referred to as IPX) on asynchronous transfer mode (hereinafter, referred to as ATM) networks, and the specifications are defined by the ATM Forum's document AF-MPOA-0087.000.

The feature of the MPOA system is that, when a destination node (target) is in a subnet different from that of a source node of data packets as viewed from the source node, communication is performed by establishing a shortcut Virtual Channel Connection (hereinafter, referred to as VCC) toward the target in an ATM network, without passing through routers, in the case of detecting a data flow (flow of continuous data packets) larger than a predetermined value.

The operation of the conventional MPOA system will be described with reference to FIG. 13. Although ATM switches forming the ATM network are not illustrated in FIG. 13, they are assumed to be placed at proper positions to establish a VCC (including a shortcut VCC) connecting each host and router. As a matter of convenience, IP is used as the layer 3 protocol in the following description, but the protocol is not limited to IP.

In FIG. 13, it is assumed that a host 610 starts to transmit IP packets to a host 650 continuously. The IP packets are forwarded through a router 620, a router 630, and a router 640, toward the host 650. At this time, an MPC 611 that is an MPOA client (hereinafter, referred to as MPC) counts the transmitted IP packets. When the above counted value becomes equal to or larger than a predetermined value in a fixed time (for example, equal to or larger than ten packets in one second), it is judged as "There is a flow". This is called as flow detection.

The MPC 611 which has detected the flow starts a shortcut communication toward the host 650. In order to start a shortcut communication, it is necessary to establish a shortcut VCC toward the host 650. In order to establish the shortcut VCC, it is necessary to know the ATM address of the host 650. Such an operation that an MPC desiring a shortcut communication obtains the ATM address of a host of a shortcut destination is called as "address resolution". In other words, the MPC 611 having detected a flow starts the address resolution of the host 650 in order to start a shortcut communication toward the host 650.

The MPC 611 creates an MPOA address resolution request packet which includes the IP address of the host 650 as the target, and transmits it to an MPOA server (hereinafter, referred to as MPS), that is, an MPS 622.

The MPS 622 transmits the MPOA address resolution request packet to an MPS 632 of a router 630 of the next hop toward the target, according to the IP routing table. An MPS like the MPS 622 is called as an ingress MPS. The MPOA address resolution request packet is forwarded one after another toward the target, according to the IP routing table.

An MPS 642 takes out the necessary information from the MPOA address resolution request packet, to create an MPOA cache imposition request packet, and transmits it to an MPC 651 of the target host 650. This is to notify the MPC 651 of Media Access Control (hereinafter, referred to as MAC) header information to be added to the IP packets, when IP packets destined to the host 650 are transmitted from the MPC 511 through a shortcut communication. In the above MAC header information, the MAC address of the host 650 is included as DA (Destination Address), and the MAC address of the router 640 is included as SA (Source Address).

The MPC 651 returns an MPOA cache imposition reply packet to the MPS 642. In the above MPOA cache imposition reply packet, an ATM address for accepting the establishment of a shortcut VCC by the MPC 651 is included.

The MPS 642 takes out the necessary information from the MPOA cache imposition reply packet, to create an MPOA address resolution reply packet, and returns it to the MPS 622 that is the ingress MPS. An MPS like the MPS 642 is called as an egress MPS. The MPOA address resolution reply packet is forwarded one after another, toward the ingress MPS, according to the IP routing table.

When the MPS 622 receives the MPOA address resolution reply packet, it returns the same packet to the MPC 611. Thus, the MPS 611 can obtain the ATM address for establishing a shortcut VCC toward the host 650. The MPOA address resolution request/reply packets and the MPOA cache imposition request/reply packets may be collectively called as MPOA packets.

The MPC 611 establishes a shortcut VCC toward the host 650 by using the above ATM address, and thereafter the IP packets destined to the host 650 are transferred to the shortcut VCC. The MPC 651 receives the IP packets through the shortcut VCC, adds the MAC header previously notified by the MPS 642 through the MPOA cache imposition request packet to the above IP packets, so to create MAC frames. Thus created MAC frames are seemed as if they were transmitted from the router 640 to the host 650.

Thereby, the upper-layer protocol processing of the host 650 may be performed in the same way as in the case where the MPOA system is not introduced.

The above-mentioned conventional MPOA system has a problem of causing Domino Effect.

Hereinafter, the Domino Effect will be described. In FIG. 14, it is assumed that a host 710 starts to transmit IP packets toward a host 750 continuously. The IP packets are forwarded through a router 720, a router 730, and a router 740, to the host 750. An MPC 711 which has detected a flow toward the host 750 transmits an MPOA address resolution request packet to an MPS 722 in order to start a shortcut communication toward the host 750.

Here, the MPC 711 counts the flow, and simultaneously an MPC 721 of the router 720 and an MPC 731 of the router 730 count the flow. Accordingly, the MPC 721 and the MPC 731 detect the flow toward the host 750, in parallel with the MPC 711. Therefore, the MPC 721 and the MPC 731 transmit the MPOA address resolution request packets to the MPS 732 and an MPS 742 respectively, in order to start a shortcut communication toward the host 750. This is called as the Domino Effect in the MPOA system.

When the Domino Effect occurs, a redundant shortcut VCC is established. This is because both of "the ATM address of a source MPC" in the respective MPOA address resolution request packets from the MPC 721 and the MPC 731 are different from that of the MPC 711, the MPS 742 that is the egress MPS regards them as different flows, and the MPS 742 processes the respective MPOA address resolution request packets from the MPC 721 and the MPC 731 in the same way as it processes the MPOA address resolution request packet from the MPC 711.

FIG. 15 shows the state where redundant shortcut VCCs have been established as a result of occurrence of the Domino Effect. In this example, although shortcut VCCs are established respectively from the router 720 and the router 730 toward the host 750, these shortcut VCCs will be never used. This is because the IP packets from the host 710 to the host 750 are all transferred on the shortcut VCC toward the host 750, in the host 710.

As the conventional technique for avoiding the Domino Effect, there is a method in which, in each router, shortcut processing is not performed on a data flow coming from an ATM network and going to an ATM network again. This technique has been described by the specifications of NHRP (RFC2332, IETF) used in the MPOA system as the address resolution protocol.

This conventional technique, however, has a problem that even a flow naturally to be targeted for a shortcut is excluded.

SUMMARY OF THE INVENTION

A first object of the present invention is, in order to solve the above problem of the conventional technique, to provide an MPOA system capable of properly avoiding the Domino Effect and its shortcut communication control method and a shortcut communication control program, without excluding even a flow naturally to be targeted for a shortcut from the object for a shortcut.

In order to solve the above problem of the conventional technique, a second object of the present invention is to provide an MPOA system capable of properly avoiding the Domino Effect and its shortcut communication control method and a shortcut communication control program, in which the MPOA client (MPC) transmits the source layer 3 address of a data packet targeted for a shortcut, which is included in an extension portion of an MPOA address resolution request packet, to an MPS and the MPOA server (MPS) controls to make valid only an address resolution request from the remotest MPC on a network and make invalid the address resolution requests from the other MPCs, according to the respective information of "destination layer 3 address", "source layer 3 address", and "hop count value" of the MPOA address resolution request packet.

According to the first aspect of the invention, an MPOA system for establishing communication by using layer 3 protocol on an ATM network, in which data about layer 3 address of a source of data packets is added to an address resolution request packet which is transmitted in order to establish a shortcut VCC toward a destination of the data packets in each communication node and hence transmitted to the destination, and in the case of accepting the address resolution request packets to be transmitted in order to establish the respective shortcut VCCs toward the destination of the data packets, as for the same communication, from a plurality of the communication nodes, the shortcut VCC is established only between the destination and the communication node remotest from the destination on the network.

In the preferred construction, whether the address resolution request packets accepted from the respective communication nodes are as for the same communication or not is determined according to respective information of the source layer 3 address and the destination layer 3 address indicated in the respective address resolution request packets.

In another preferred construction, in the case of accepting the address resolution request packets as for the same communication from a plurality of the respective communication nodes, the communication node remotest from the destination on the network is selected, according to the information of hop count values indicated in the address resolution request packets and the shortcut VCC is established only between the selected communication node and the destination.

In another preferred construction, MPOA clients of the respective communication nodes relaying communication add the information of the source layer 3 address of the data packets to the address resolution request packet corresponding to the data packets targeted for a shortcut and transmit the address resolution request packet to an MPOA server of the next hop toward the destination node, while the MPOA servers of the respective communication nodes relaying communication accept the address resolution request packets transmitted from the respective MPOA clients and when this MPOA server is an egress MPOA server that is the MPOA server on the communication node directly connecting with the destination node, the same MPOA server detects the address resolution request packets transmitted as for the same communication from a plurality of the MPOA clients, according to the information of the source layer 3 address and the destination layer 3 address indicated in the respective address resolution request packets, and in the case of accepting the address resolution request packets as for the same communication from a plurality of the MPOA clients, the same MPOA server detects the address resolution request from the MPOA client remotest from the destination on the network, according to the information of the hop count values indicated in the address resolution request packets and controls to make valid only the detected address resolution request.

In another preferred construction, the information of the source layer 3 address of the data packets is added to the address resolution request packet to be transmitted in order to establish a shortcut VCC of the data packets, by using a vendor private extension of an MPOA packet.

In another preferred construction, a source layer 3 address extension is defined as an extension portion of the MPOA packet, in the address resolution request packet to be transmitted in order to establish a shortcut VCC of the data packets and the information of the source layer 3 address of the data packets is added to the address resolution request packet by using the source layer 3 address extension.

According to the second aspect of the invention, a communication device for establishing MPOA communication, in which data about layer 3 address of a source of data packets is added to an address resolution request packet which is transmitted in order to establish a shortcut VCC toward a destination of the data packets and hence transmitted to the destination, and in the case of accepting the address resolution request packets to be transmitted in order to establish the respective shortcut VCCs toward the destination of the data packets, as for the same communication, from a plurality of the communication nodes, the shortcut VCC is established only between the destination and the communication node remotest from the destination on the network.

In the preferred construction, whether the address resolution request packets accepted from the respective communication nodes are as for the same communication or not is determined according to the respective information of the source layer 3 address and the destination layer 3 address indicated in the respective address resolution request packets.

In another preferred construction, in the case of accepting the address resolution request packets as for the same communication from a plurality of the respective communication nodes, the communication node remotest from the destination on the network is selected, according to the information of hop count values indicated in the address resolution request packets and the shortcut VCC is established only between the selected communication node and the destination.

In another preferred construction, the communication device comprises MPOA clients and MPOA servers, in which
the MPOA clients
add the information of the source layer 3 address of the data packets to the address resolution request packet corresponding to the data packets targeted for a shortcut and transmit the address resolution request packet to an MPOA server of the next hop toward the destination node, while
the MPOA servers
accept the address resolution request packet transmitted from the respective MPOA clients and when this MPOA server is an egress MPOA server that is the MPOA server on the communication node directly connecting with the destination node, the same MPOA server detects the address resolution request packets transmitted as for the same communication from a plurality of the MPOA clients, according to the information of the source layer 3 address and the destination layer 3 address indicated in the respective address resolution request packets, and
in the case of accepting the address resolution request packets as for the same communication from a plurality of the MPOA clients, the same MPOA server detects the address resolution request from the MPOA client remotest from the destination on the network, according to the information of the hop count values indicated in the address resolution request packets and controls to make valid only the detected address resolution request.

In another preferred construction, the information of the source layer 3 address of the data packets is added to the address resolution request packet to be transmitted in order to establish a shortcut VCC of the data packets, by using a vendor private extension of an MPOA packet.

In another preferred construction, a source layer 3 address extension is defined as an extension portion of the MPOA packet, in the address resolution request packet to be transmitted in order to establish a shortcut VCC of the data packets and the information of the source layer 3 address of the data packets is added to the address resolution request packet by using the source layer 3 address extension.

According to the third aspect of the invention, a shortcut communication control method of MPOA communication, comprising the following steps of
adding data about layer 3 address of a source of data packets to an address resolution request packet which is transmitted in order to establish a shortcut VCC toward a destination of the data packets and hence transmitting the packet to the destination; and
establishing a shortcut VCC only between the destination and the communication node remotest from the destination on the network, in the case of accepting the address resolution request packets to be transmitted in order to establish the respective shortcut VCCs toward the destination of the data packets, as for the same communication, from a plurality of the communication nodes.

In the preferred construction, the shortcut communication control method comprises
a step of accepting the address resolution request packets from the respective communication nodes and determining whether the address resolution request packets are as for the same communication or not, according to the respective information of the source layer 3 address and the destination layer 3 address indicated in the respective address resolution request packets.

In another preferred construction, the shortcut communication control method comprises
a step of selecting the communication node remotest from the destination on the network, according to the information of hop count values indicated in the address resolution request packets, in the case of accepting the address resolution request packets as for the same communication from a plurality of the respective communication nodes, and establishing the shortcut VCC only between the selected communication node and the destination.

In another preferred construction, the shortcut communication control method comprises
in an MPOA client of each communication node relaying communication,
a step of adding the information of the source layer 3 address of the data packets to the address resolution request packet corresponding to the data packets targeted for a shortcut and transmitting the address resolution packet to an MPOA server of the next hop toward the destination node; while
in the MPOA server of each communication node relaying communication,
a step of accepting the address resolution request packets transmitted from the respective MPOA clients, and a step of detecting the address resolution request packets transmitted as for the same communication from a plurality of the MPOA clients, according to the respective information of the source layer 3 address and the destination layer 3 address indicated in the respective address resolution request packets, when this MPOA server is an egress MPOA server that is the MPOA server on the communication node directly connecting with the destination node; and
a step of detecting the address resolution request from the MPOA client remotest from the destination on the network, according to the information of the hop count values indicated in the address resolution request packets and controlling to make valid only the detected address resolution request, in the case of accepting the address resolution request packets as for the same communication from a plurality of the MPOA clients.

In another preferred construction, the shortcut communication control method comprises a step of adding the information of the source layer 3 address of the data packets to the address resolution request packet to be transmitted in order to establish a shortcut VCC of the data packets, by using a vendor private extension of an MPOA packet.

In another preferred construction, the shortcut communication control method comprises a step of defining a source layer 3 address extension as an extension portion of the MPOA packet, in the address resolution request packet to be transmitted in order to establish a shortcut VCC of the data packets and adding the information of the source layer 3 address of the data packets to the address resolution request packet by using the source layer 3 address extension.

According to another aspect of the invention, a shortcut communication control program for controlling MPOA shortcut communication by controlling a computer, having the following functions of adding data about layer 3 address of a source of data packets to an address resolution request packet which is transmitted in order to establish a shortcut VCC toward a destination of the data packets and hence transmitting the packet to the destination, and establishing a shortcut VCC only between the destination and the communication node remotest from the destination on the network, in the case of accepting the address resolution request packets to be transmitted in order to establish the respective shortcut VCCs toward the destination of the data packets, as for the same communication, from a plurality of the communication nodes.

In the preferred construction, the shortcut communication control program comprises a function of accepting the address resolution request packets from the respective communication nodes and determining whether the address resolution request packets are as for the same communication or not, according to the respective information of the source layer 3 address and the destination layer 3 address indicated in the respective address resolution request packets.

In another preferred construction, the shortcut communication control program comprises a function of selecting the communication node remotest from the destination on the network, according to the information of hop count values indicated in the address resolution request packets, in the case of accepting the address resolution request packets as for the same communication from a plurality of the respective communication nodes, and establishing the shortcut VCC only between the selected communication node and the destination.

In another preferred construction, the shortcut communication control program comprises in an MPOA client of each communication node relaying communication, a function of adding the information of the source layer 3 address of the data packets to the address resolution request packet corresponding to the data packets targeted for a shortcut and transmitting the address resolution packet to an MPOA server of the next hop toward the destination node, while in the MPOA server of each communication node relaying communication, a function of accepting the address resolution request packets transmitted from the respective MPOA clients, and a function of detecting the address resolution request packets transmitted as for the same communication from a plurality of the MPOA clients, according to the respective information of the source layer 3 address and the destination layer 3 address indicated in the respective address resolution request packets, when this MPOA server is an egress MPOA server that is the MPOA server on the communication node directly connecting with the destination node, and a function of detecting the address resolution request from the MPOA client remotest from the destination on the network, according to the information of the hop count values indicated in the address resolution request packets and controlling to make valid only the detected address resolution request, in the case of accepting the address resolution request packets as for the same communication from a plurality of the MPOA clients.

In another preferred construction, the shortcut communication control program comprises a function of adding the information of the source layer 3 address of the data packets to the address resolution request packet to be transmitted in order to establish a shortcut VCC of the data packets, by using a vendor private extension of an MPOA packet.

In another preferred construction, the shortcut communication control program comprises a function of defining a source layer 3 address extension as an extension portion of the MPOA packet, in the address resolution request packet to be transmitted in order to establish a shortcut VCC of the data packets and adding the information of the source layer 3 address of the data packets to the address resolution request packet by using the source layer 3 address extension.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

The present invention is to avoid the occurrence of the Domino Effect and dissolve the conventional problem properly, without excluding a flow naturally to be targeted for a shortcut from the object for a shortcut, in an MPOA communication. The feature of the present invention is that an MPC is provided with a function of transmitting the source layer 3 address of a data packet targeted for a shortcut, which is included in an extension portion of an MPOA address resolution request packet, to an MPS, and that the MPS detects an address resolution request from the remotest MPC on a network and makes valid only the above address resolution request and invalid the address resolution requests from the other MPCs, according to the information such as "destination layer 3 address", "source layer 3 address", and "hop count value" in the above MPOA address resolution request packet.

Figure 1:
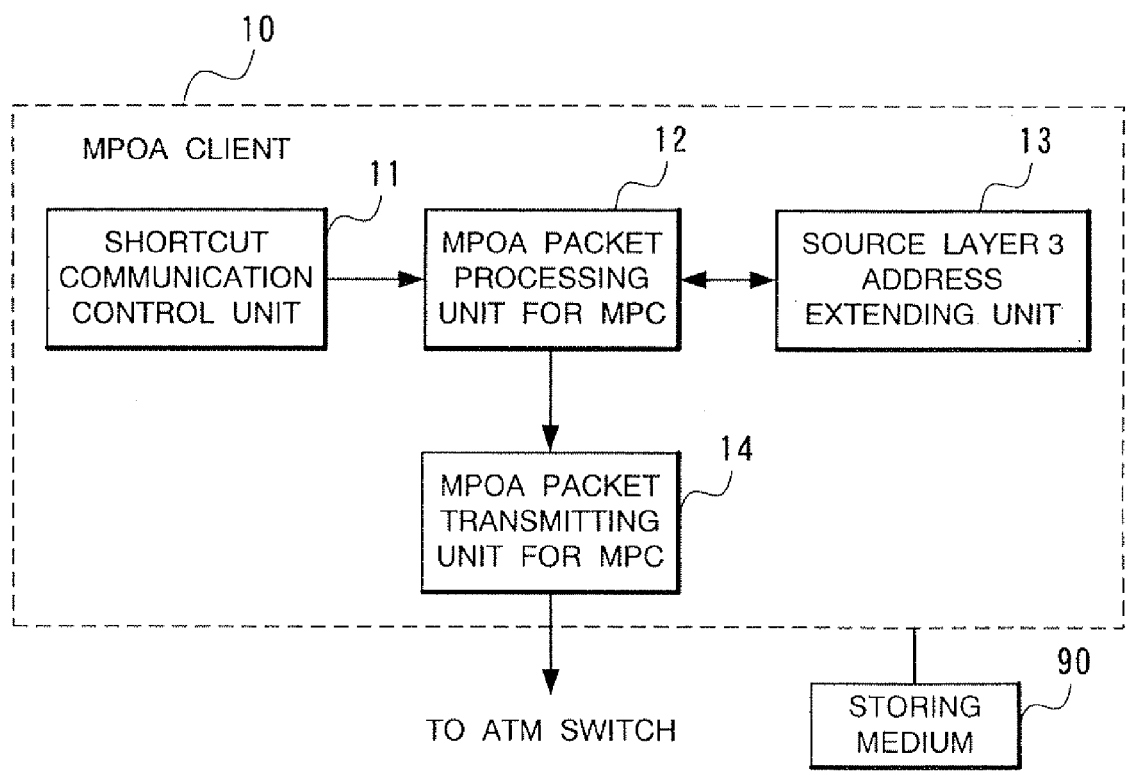
FIG. 1 is a block diagram showing the structure of an MPOA client (MPC) according to a first embodiment of the present invention.

A first embodiment of the present invention will be described. FIG. 1 is a block diagram showing the structure of an MPC 10 according to the first embodiment of the present invention, and FIG. 2 is a block diagram showing the structure of an MPS 20 according to the first embodiment of the present invention.

Referring to FIG. 1, the MPC 10 of this embodiment comprises a shortcut communication control unit 11, an MPOA packet processing unit 12 for MPC, a source layer 3 address extending unit 13, and an MPOA packet transmitting unit 14 for MPC. The shortcut communication control unit 11, the source layer 3 address extending unit 13, and the MPOA packet transmitting unit 14 for MPC are respectively connected to the MPOA packet processing unit 12 for MPC. The MPOA packet transmitting unit 14 for MPC is connected to an outside ATM switch.

Figure 2:
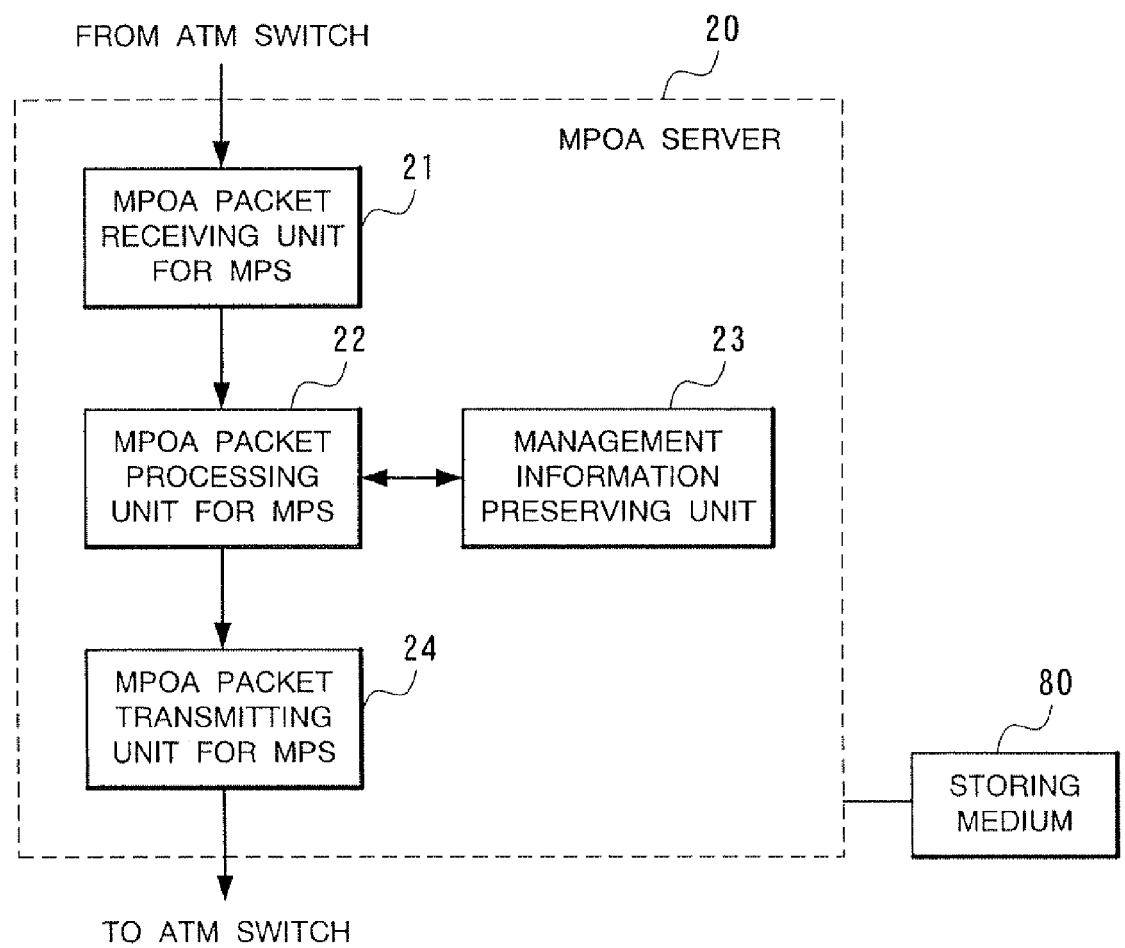
FIG. 2 is a block diagram showing the structure of an MPOA server (MPS) according to the first embodiment of the present invention.

With reference to FIG. 2, the MPS 20 of this embodiment comprises an MPOA packet receiving unit 21 for MPS, an MPOA packet processing unit 22 for MPS, a management information preserving unit 23, and an MPOA packet transmitting unit 24 for MPS. The MPOA packet receiving unit 21 for MPS, the management information preserving unit 23, and the MPOA packet transmitting unit 24 for MPS are respectively connected to the MPOA packet processing unit 22. The MPOA packet receiving unit 21 for MPS and the MPOA packet transmitting unit 24 for MPS are respectively connected to outside ATM switches.

FIG. 1 and FIG. 2 show only the portion realizing the function of this embodiment, and a description of the other functions forming the MPS 20 and the MPC 10 is omitted.

Figure 4:
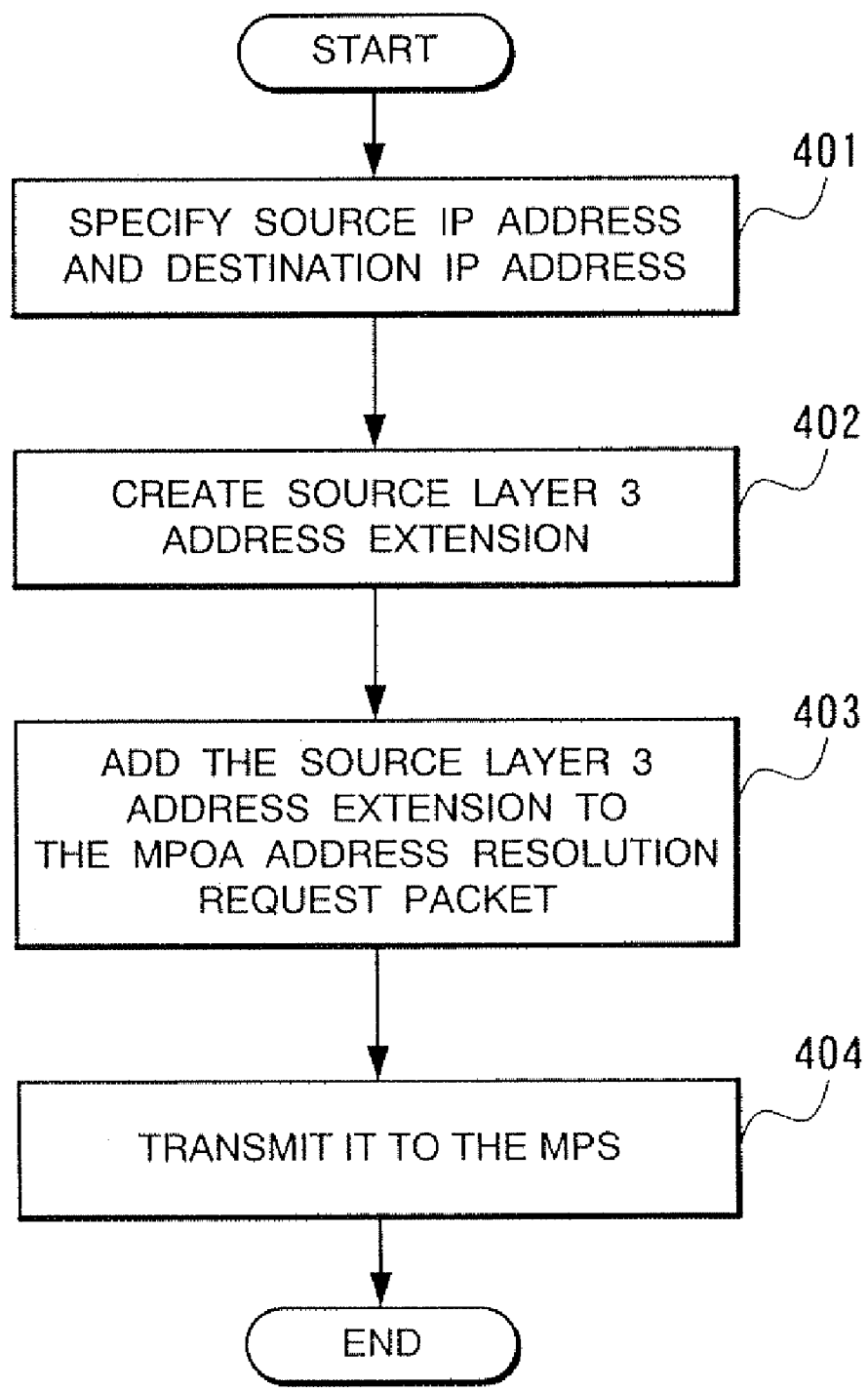
FIG. 4 is a flow chart for use in describing the operation of the MPOA client (MPC) according to the first embodiment of the present invention.
Figure 5:
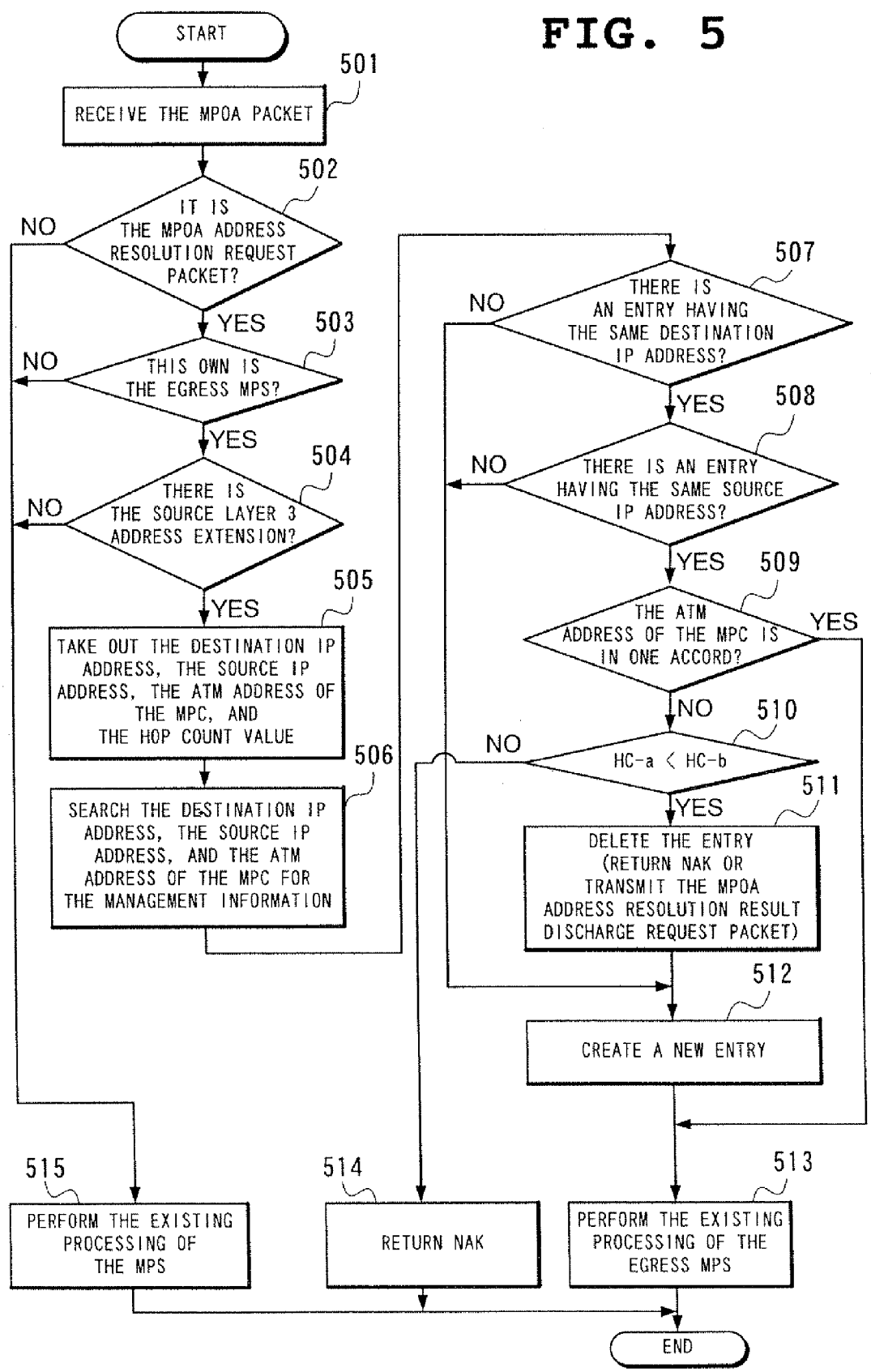
FIG. 5 is a flow chart for use in describing the operation of the MPOA server (MPS) according to the first embodiment of the present invention.

The operation of this embodiment will be described in detail, referring to the drawings. FIG. 4 is a flow chart for use in describing the operation of the MPC 10 according to the embodiment, and FIG. 5 is a flow chart for use in describing the operation of the MPS 20 according to the embodiment. In the following description, by way of example, IP is used as the layer 3 protocol, but in the present invention, the protocol is not restricted to IP.

Referring to FIG. 4, in the operation of the MPC 10 of the embodiment, the shortcut communication control unit 11 starts the operation upon detection of a flow and transmits an instruction "start a shortcut communication" to the MPOA packet processing unit 12 for MPC. This instruction includes the source IP address and the destination IP address of the data targeted for a shortcut communication (Step 401).

The MPOA packet processing unit 12 for MPC passes the above source IP address to the source layer 3 address extending unit 13. The source layer 3 address extending unit 13 creates an MPOA packet extension including the source IP address and notifies it to the MPOA packet processing unit 12 for MPC (Step 402).

The MPOA packet processing unit 12 for MPC creates an MPOA address resolution request packet based on the above destination IP address, adds the MPOA packet extension to the MPOA address resolution request packet, and passes it to the MPOA packet transmitting unit 14 for MPC (Step 403).

The MPOA packet transmitting unit 14 for MPC transmits the MPOA address resolution request packet to the MPS (Step 404), thereby completing the processing by the MPC 10.

Figure 3:
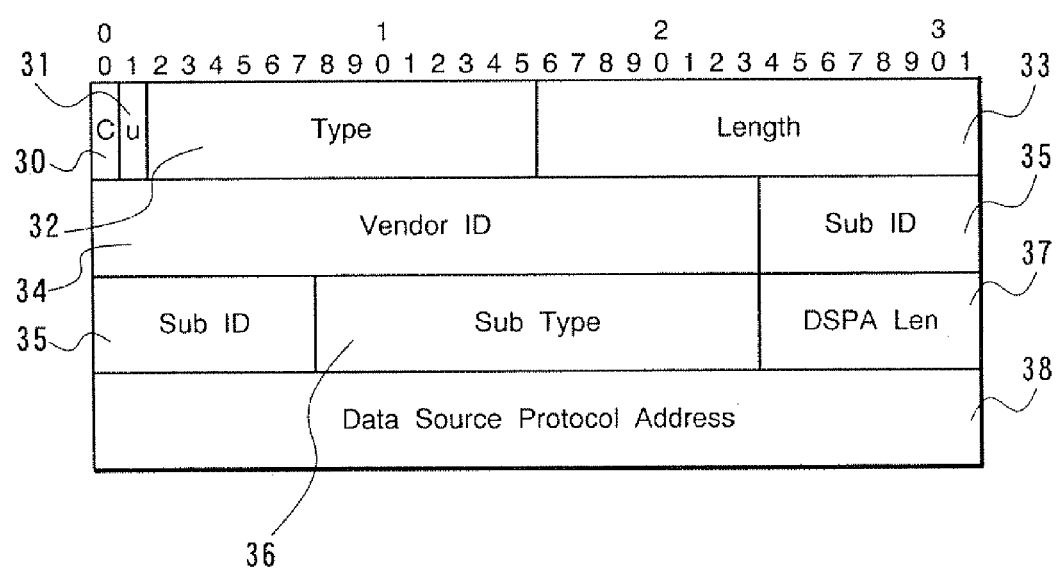
FIG. 3 is a view showing an example of a format of MPOA packet extension for preserving the source IP address of the first embodiment of the present invention.

FIG. 3 is a view showing an example of a format of the MPOA packet extension for preserving the source IP address, according to the embodiment. In the example of FIG. 3, "vendor private extension" of an MPOA packet is used. Each field will be described as below. The value is decimal, unless otherwise specified.

The value "0" is specified in the C field 30 and the u field 31.

The value "8" indicating that this is the "vendor private extension" is specified in the Type field 32.

In the Length field 33, the length from the Vendor ID field 34 to the Data Source Protocol Address field 38 is specified by octet.

The number for identifying the vendor who has defined this vendor private extension is specified in the Vendor ID field 34. For example, "119" indicating "NEC Corporation" is specified there.

In the Sub ID field 35, a proper value is determined and specified in order to distinguish a different project and model within the same vendor.

In the Sub Type field 36, a function of this vendor private extension is specified. For example, "1" is specified as a value indicating that it is the "source layer 3 address extension", and the like.

In the DSPA Len field 37, the length of the source layer 3 address to be stored in the Data Source Protocol Address field 38 is specified by octet.

In the Data Source Protocol Address field 38, the source layer 3 address is specified.

The MPC 10 of the embodiment performs the same operation as that of the conventional MPC, except for the above-mentioned operation of adding the source IP address of the data targeted for a shortcut communication to the MPOA address resolution request packet.

Referring to FIG. 5, in the operation of the MPS 20 of the embodiment, the MPOA packet receiving unit 21 for MPS starts the operation upon receipt of an MPOA packet from the MPC 10, and passes the received MPOA packet to the MPOA packet processing unit 22 for MPS (Step 501).

The MPOA packet processing unit 22 for MPS determines the type of the above MPOA packet (Step 502). When it is not the type of the MPOA address resolution request, the same processing as that of the conventional MPS is performed (Step 515), thereby completing the processing.

When it is the type of the MPOA address resolution request, the MPOA packet processing unit 22 for MPS determines whether this MPS itself is the egress MPS or not (Step 503). When it is not the egress MPS, the same processing as that of the conventional MPS is performed (Step 515), thereby completing the processing of the MPS 20.

When this MPS itself is the egress MPS, the MPOA packet processing unit 22 for MPS determines whether the source layer 3 address extension is added to the MPOA address resolution request packet (Step 504). When the source layer 3 address extension is not added there, the same processing as that of the conventional MPS is performed (Step 515), thereby completing the processing of the MPS 20.

When the source layer 3 address extension is added to the MPOA address resolution request packet, the MPOA packet processing unit 22 for MPS takes out the destination IP address, the source IP address, the ATM address of the MPC, and the hop count value from the above MPOA address resolution request packet (Step 505).

The MPOA packet processing unit 22 for MPS searches the destination IP address, the source IP address, and the ATM address of the corresponding MPC for the management information preserved in the management information preserving unit 23 (Step 506), and determines whether there exists an entry matched with the destination IP address (Step 507). When there exists no entry matched with the destination IP address, the unit 22 creates a new entry corresponding to the MPOA address resolution request packet within the management information preserving unit 23 (Step 512), and performs the processing of the conventional MPS as the egress MPS (Step 513), thereby completing the processing of the MPS 20.

When there exists an entry matched with the destination IP address, the unit 22 further determines whether there exists an entry matched with the source IP address, in the above entry matched with the destination IP address (Step 508). When there exists no entry matched with the source IP address, the unit 22 creates a new entry corresponding to the MPOA address resolution request packet within the management information preserving unit 23 (Step 512), and performs the processing of the conventional MPS as the egress MPS (Step 513), thereby completing the processing of the MPS 20.

When there exists an entry matched with the source IP address, the unit 22 determines whether this entry matched with the destination IP address and the source IP address is matched with the ATM address of the MPC (Step 509). When the entry is matched with the ATM address of the MPC, the unit 22 performs the processing of the conventional MPS as the egress MPS on the above entry (Step 513), thereby completing the processing of the MPS 20.

When the entry is not matched with the ATM address of the MPC, the unit 22 compares this hop count value (hereinafter, referred to as HC-a) with the hop count value preserved in the entry (hereinafter, referred to as HC-b) (Step 510). Since the hop count value of the MPOA address resolution request packet is subtracted one by one in each MPS at every transfer to the MPS of the next hop, it proves that an MPOA address resolution request packet having the smaller hop count value comes from the remoter MPS. When HC-a is not smaller than HC-b, a reply packet to the effect of address resolution impossible (NAK) is returned to the MPC (Step 514), in reply to the MPOA address resolution request packet, thereby completing the processing of the MPS 20.

When HC-a is smaller than HC-b, the MPOA packet processing unit 22 for MPS performs the processing of deleting the entry from the management information preserving unit 23 (Step 511). This delete processing is the same as the delete processing of the conventional egress MPS, and it includes the operation of returning the NAK or an MPOA address resolution result purge request packet to the MPC corresponding to the entry, depending on the state of the entry.

The MPOA packet processing unit 22 for MPS creates a new entry corresponding to the MPOA address resolution request packet within the management information preserving unit 23 (Step 512), and performs the processing of the conventional MPS as the egress MPS (Step 513), thereby completing the processing of the MPS 20.

The MPS 20 of the embodiment performs the same operation as that of the conventional MPS, except for the above-mentioned operation as the egress MPS.

The effective operation of the MPOA system of the embodiment will be described by taking the following concrete operation as an example, by comparison with the conventional MPOA system.

A first example of the concrete operation will be described, according to FIG. 6 and FIG. 7. In this example, MPCs are respectively provided in the host 510 and the host 550 and pairs of MPS and MPC are respectively provided in the router 520, the router 530, and the router 540.

Figure 6:
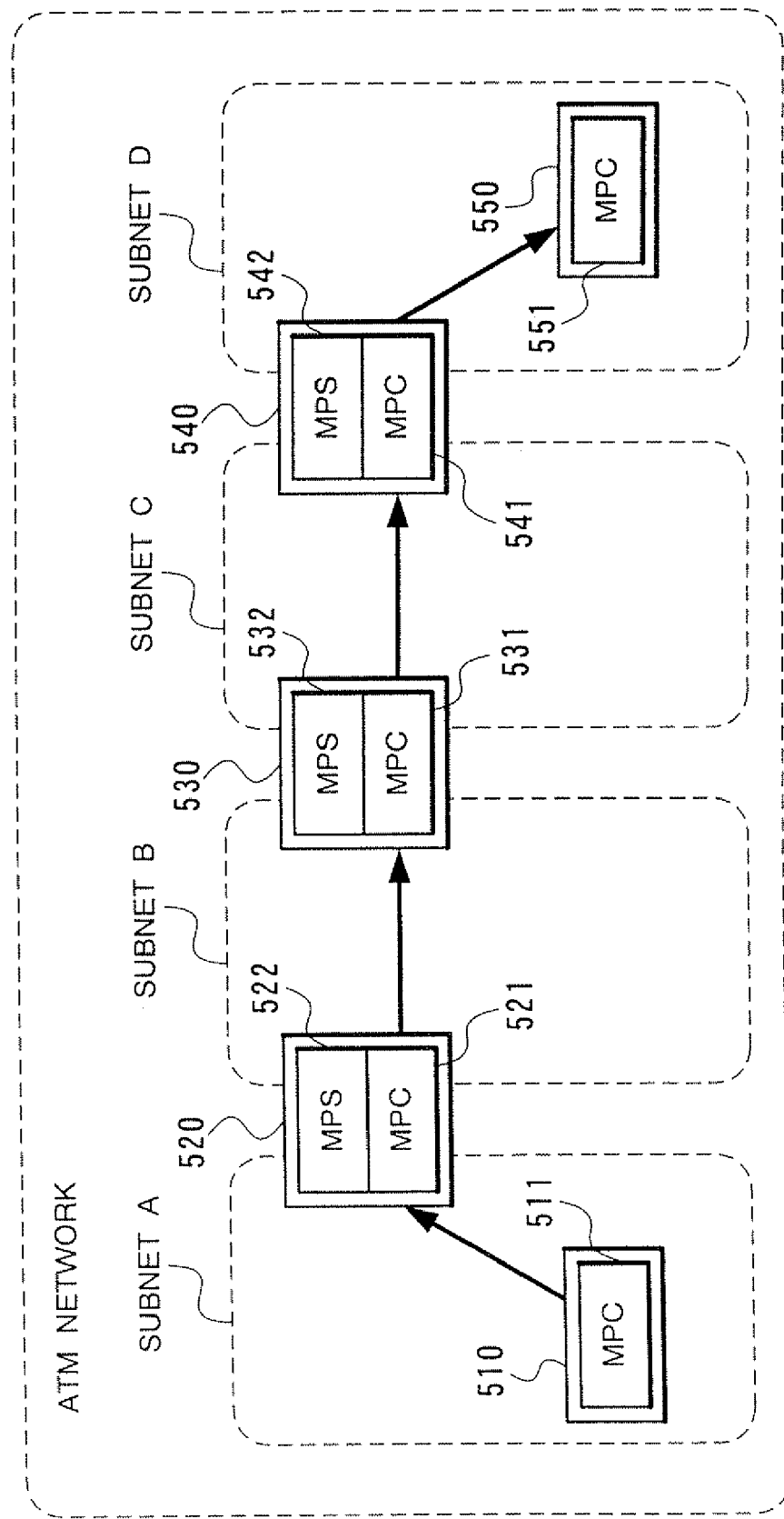
FIG. 6 is a view for use in describing a first example of the concrete operation of an MPOA system according to the first embodiment of the present invention.

In FIG. 6, it is assumed that the host 510 starts to transmit IP packets toward the host 550 continuously. Since the MPC 511 detects a flow toward the host 550, the MPC 511 starts an operation of establishing a shortcut VCC toward the host 550. At the same time, since the MPC 521 and the MPC 531 respectively detect a flow toward the host 550, they also start the respective operations of establishing a shortcut VCC toward the host 550.

In the MPS 542 that is the egress MPS, since the hop count value of the MPOA address resolution request packet from the MPC 511 is smaller than the other hop count values of the MPOA address resolution request packets from the other MPCs, only the MPOA address resolution request packet from the MPC 511 is regarded as valid.

Figure 7:
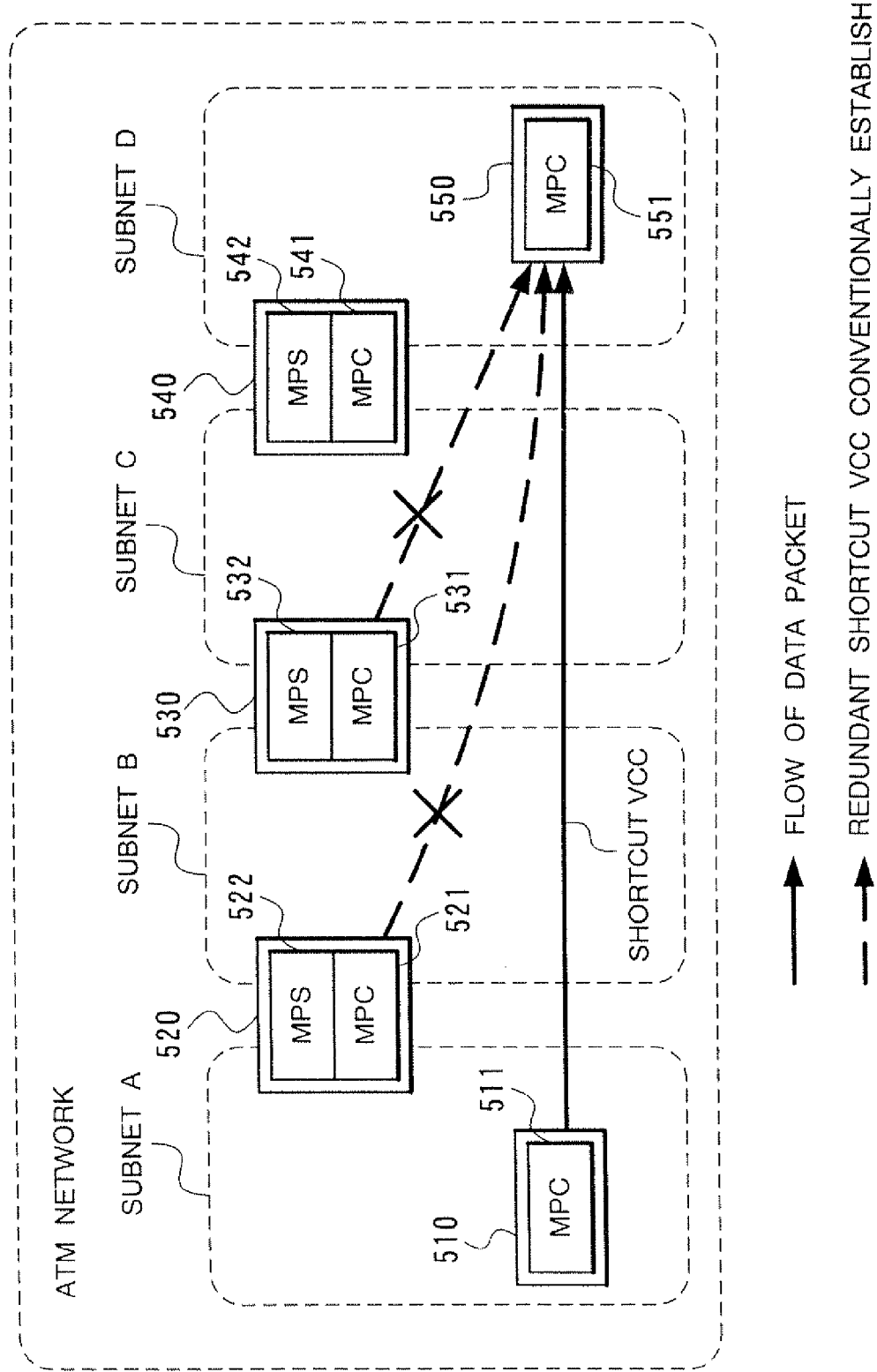
FIG. 7 is a view for use in describing the first example of the concrete operation of the MPOA system according to the first embodiment of the present invention.

Accordingly, as illustrated in FIG. 7, a shortcut VCC toward the host 550 is not established from the router 520 nor the router 530, but it is established only from the host 510.

In the case of the first example of the concrete operation, the MPOA system of the embodiment can establish only a necessary shortcut VCC, though a conventional MPOA system would establish redundant shortcut VCCs toward the host 550 respectively from the router 520 and the router 530.

A second example of the concrete operation will be described, according to FIG. 8 and FIG. 9. In the second example, an MPC is provided only in the host 550, but not in the host 510, and pairs of MPS and MPC are respectively provided in the router 520, the router 530, and the router 540.

Figure 8:
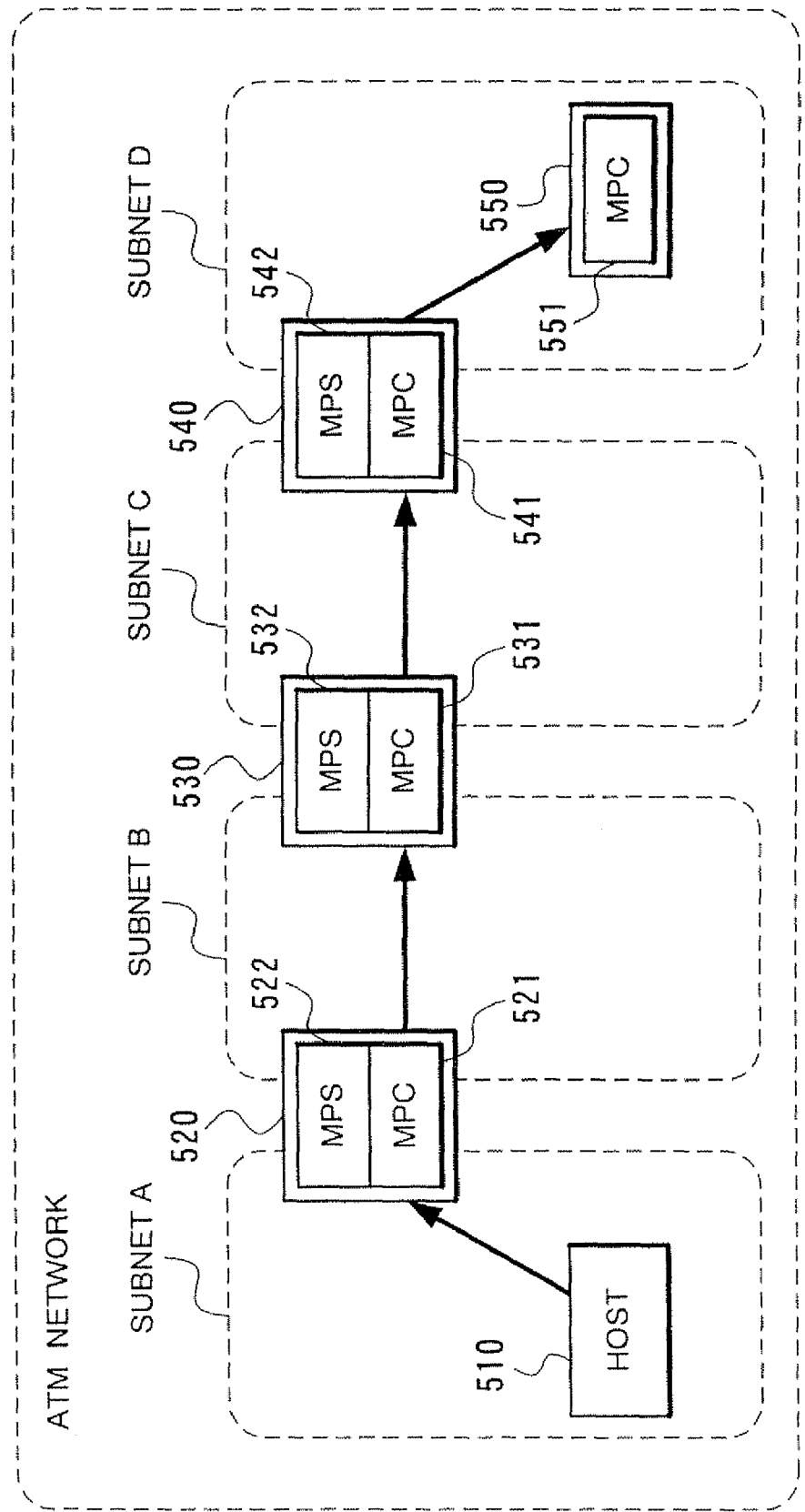
FIG. 8 is a view for use in describing a second example of the concrete operation of the MPOA system according to the first embodiment of the present invention.

In FIG. 8, it is assumed that the host 510 starts to transmit IP packets to the host 550 continuously. Since the host 510 is not provided with the MPC, the host 510 does not perform the shortcut operation, but instead, the MPC 521 detects a flow toward the host 550 and the MPC 521 starts the operation of establishing a shortcut VCC toward the host 550. At the same time, the MPC 531 detects a flow toward the host 550 and the MPC 531 also starts the operation of establishing a shortcut VCC toward the host 550.

In the MPS 542 that is the egress MPS, since the hop count value of the MPOA address resolution request packet from the MPC 521 is smaller than the other hop count value of the MPOA address resolution request packet from the other MPC, only the MPOA address resolution request packet from the MPC 521 is regarded as valid.

Figure 9:
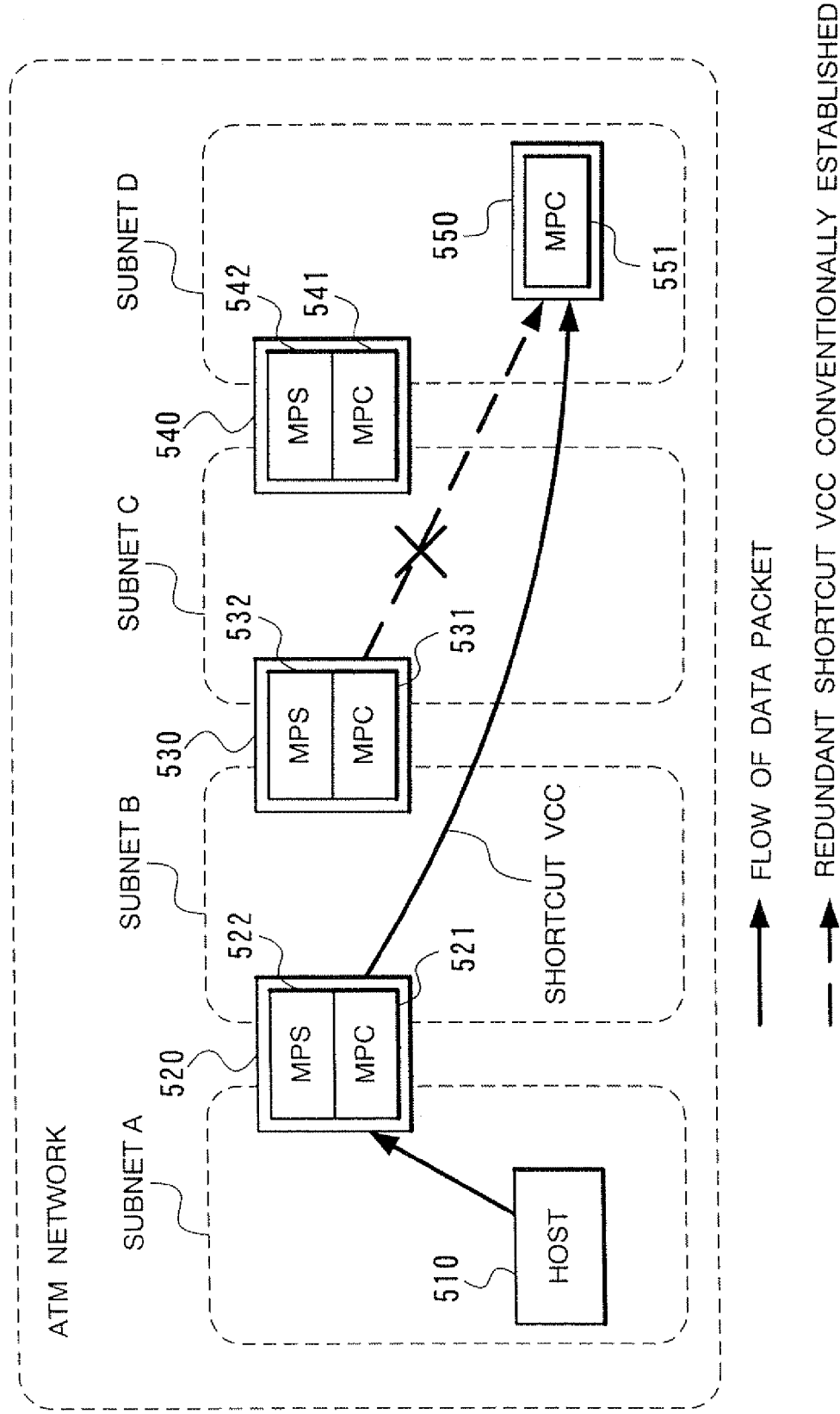
FIG. 9 is a view for use in describing the second example of the concrete operation of the MPOA system according to the first embodiment of the present invention.

Accordingly, as illustrated in FIG. 9, a shortcut VCC toward the host 550 is not established from the router 530, but it is established only from the router 520.

In the case of the second example of the concrete operation, a conventional MPOA system would establish a redundant shortcut VCC from the router 530 toward the host 550. Further, if using the method of avoiding the Domino Effect of the conventional MPOA system, it cannot establish a shortcut VCC from the router 520 to the host 550, although it can avoid establishment of a shortcut VCC from the router 530 to the host 550.

The MPOA system of the embodiment, however, can establish only a necessary shortcut VCC, so to control a shortcut communication properly.

A third example of the concrete operation will be described, based on FIG. 10 and FIG. 11. In the third example, MPCs are respectively provided in the host 510 and the host 550, and pairs of MPS and MPC are respectively provided in the router 520, the router 530, and the router 540, but no MPC is provided in a host 560.

Figure 10:
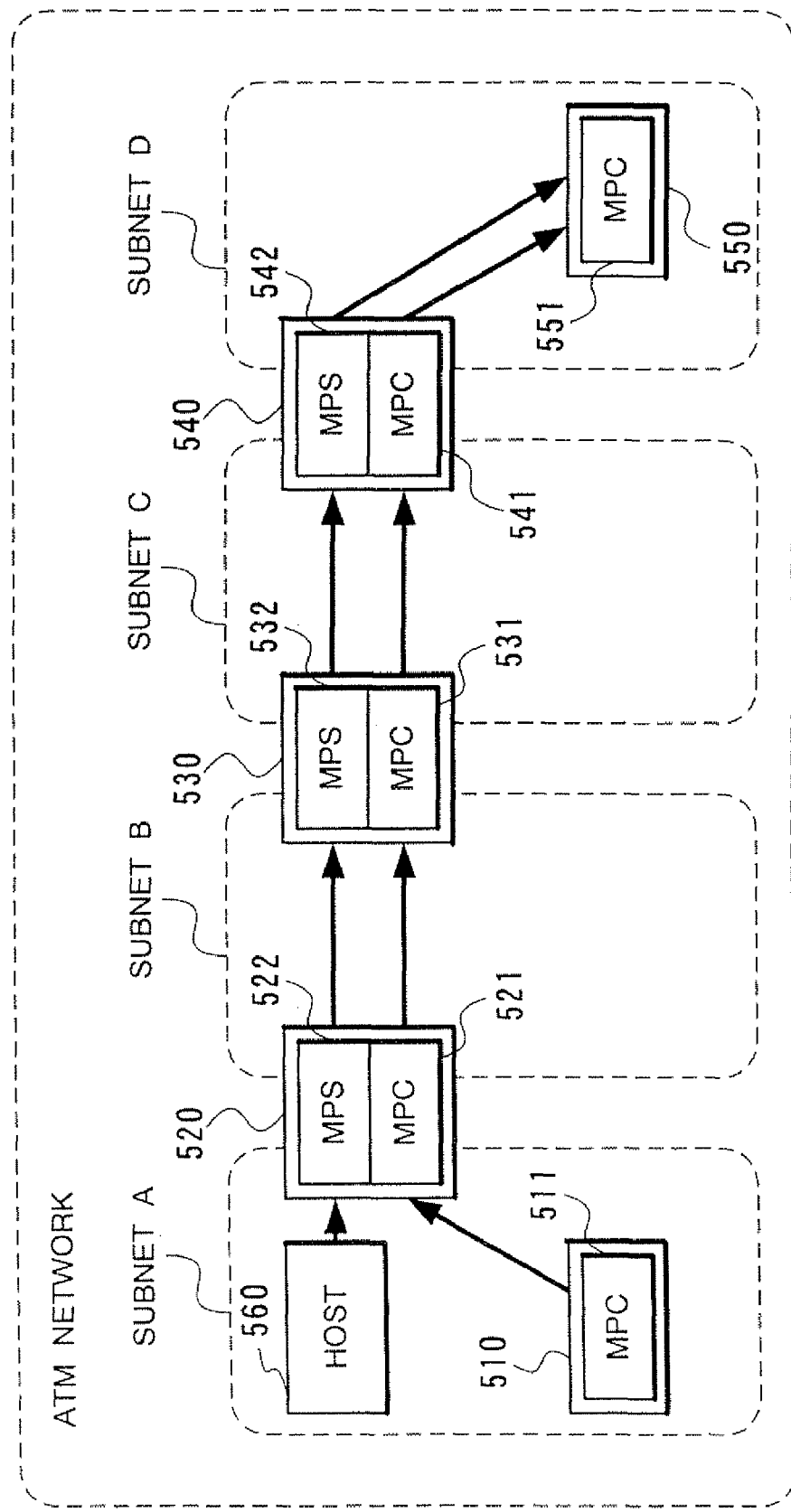
FIG. 10 is a view for use in describing a third example of the concrete operation of the MPOA system according to the first embodiment of the present invention.

In FIG. 10, it is assumed that the host 510 starts to transmit IP packets toward the host 550 continuously, and in parallel, the host 560 starts to transmit the data toward the host 550 continuously. Here, the data transmission from the respective host 510 and host 560 need not be simultaneous.

Since the MPC 511 detects a flow toward the host 550, the MPC 511 starts an operation of establishing a shortcut VCC toward the host 550. At the same time, since the MPC 521 and the MPC 531 respectively detect a flow toward the host 550, they start the respective operations of establishing a shortcut VCC toward the host 550.

In parallel, in the example of FIG. 10, since the host 560 is provided with no MPC, it does not perform the shortcut operation. Instead, since the MPC 521 and the MPC 531 respectively detect a flow toward the host 550, they start the respective operations of establishing a shortcut VCC toward the host 550.

In the MPS 542 that is the egress MPS, as for the flow from the host 510 to the host 550, since the hop count value of the MPOA address resolution request packet from the MPC 511 is smaller than the other hop count values of the MPOA address resolution request packets from the other MPCs, only the MPOA address resolution request packet from the MPC 511 is regarded as valid.

Further, as for the flow from the host 560 to the host 550, since the hop count value of the MPOA address resolution request packet from the MPC 521 is smaller than the other hop count value of the MPOA address resolution request packet from the other MPC, only the MPOA address resolution request packet from the MPC 521 is regarded as valid.

Figure 11:
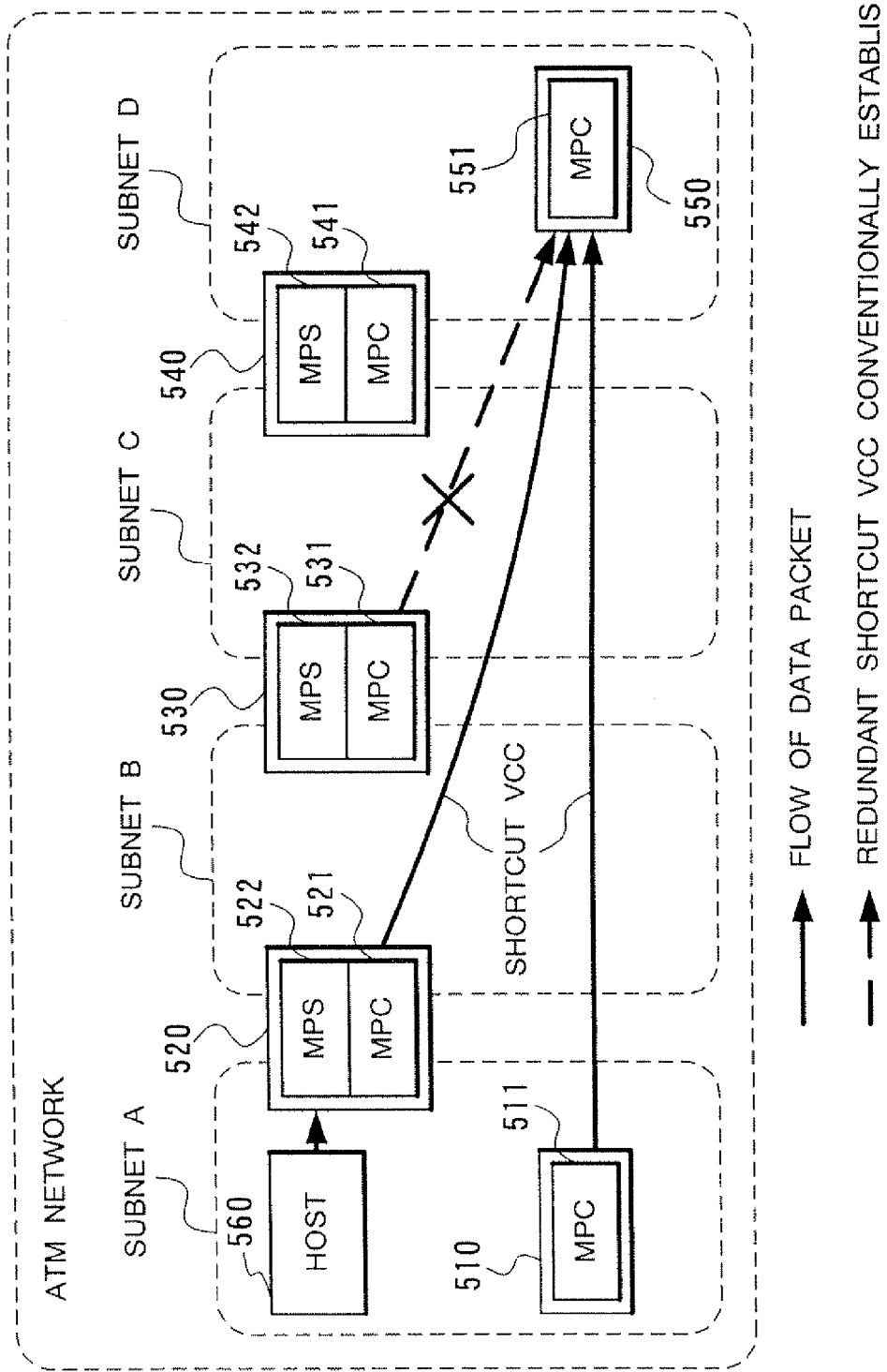
FIG. 11 is a view for use in describing the third example of the concrete operation of the MPOA system according to the first embodiment of the present invention.

Accordingly, as illustrated in FIG. 11, a shortcut VCC from the host 510 to the host 550 and a shortcut VCC from the router 520 to the host 550 are both established.

In the case of the third example of the concrete operation, a conventional MPOA system would establish a redundant shortcut VCC from the router 530 to the host 550. Further, if using the method of avoiding the Domino Effect of the conventional MPOA system, as for a flow from the host 560 to the host 550, it cannot establish a shortcut VCC from the router 520 to the host 550, although it can avoid establishment of the shortcut VCC from the router 530 to the host 550.

The MPOA system of the embodiment, however, can establish only a necessary shortcut VCC, so to control a shortcut communication properly.

The MPOA system of the embodiment need not be always provided with the MPS and MPC of the embodiment in all the communication nodes, but it is operable also in the case where there are the conventional MPS and MPC in a mixed way within a communication network. Namely, the MPS and MPC of the embodiment are compatible with the conventional MPS and MPC. Even when the MPC of the embodiment transmits an MPOA address resolution request packet including the source IP address to the conventional MPS, the same conventional MPS can process the received MPOA address resolution request packet without any problem.

This is because the MPOA system of the embodiment adopts a method of preserving the source IP address in an extension portion of an MPOA packet and the conventional MPS which does not have a function of processing the extension portion of the MPOA packet processes the same packet as an ordinal MPOA packet, neglecting its extension portion (C field is defined as "0").

Further, in the case where there are the conventional MPSs having no function of the present invention on a communication channel in a mixed way, though there may occur the Domino Effect similarly to the conventional technique and a failure in proper establishment of a shortcut VCC, a proper communication can be performed without the above failure in each communication node having the function of the present invention on the communication channel. Therefore, the present invention can restrain the possibility and scale of causing the above failure, compared with the conventional MPOA system where every communication node never has the function of the present invention.

A second embodiment of the present invention will be described, this time.

Although the MPC of the present invention adopts the "vendor private extension" of the MPOA packet in the first embodiment, as a method of adding a source IP address to an MPOA address resolution request packet, it is not restricted to this method, but, for example, "source layer 3 address extension" may be newly defined as a normal extension portion of the MPOA and the source IP address may be added to the MPOA address resolution request packet.

Figure 12:
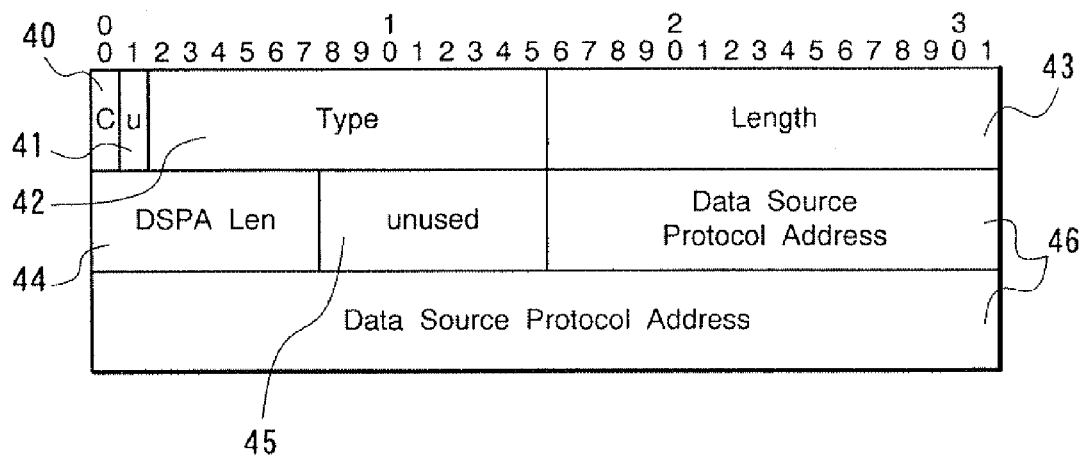
FIG. 12 is a view showing an example of a format in which "source layer 3 address extension" is newly defined as a normal extension portion of the MPOA in order to add the source IP address to the MPOA address resolution request packet, according to a second embodiment of the present invention.
Figure 13:
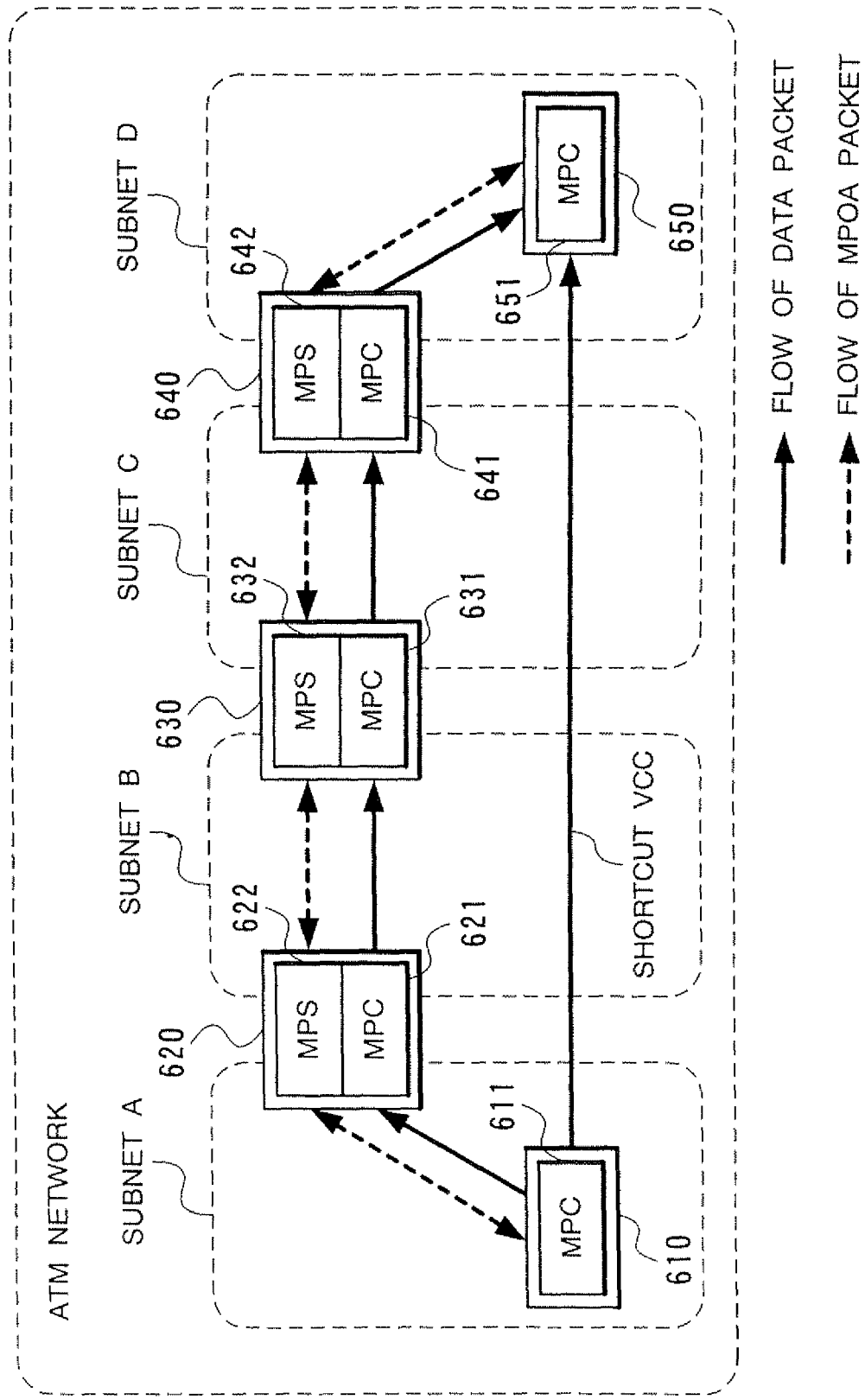
FIG. 13 is a view for use in describing the operation of a conventional MPOA system.
Figure 14:
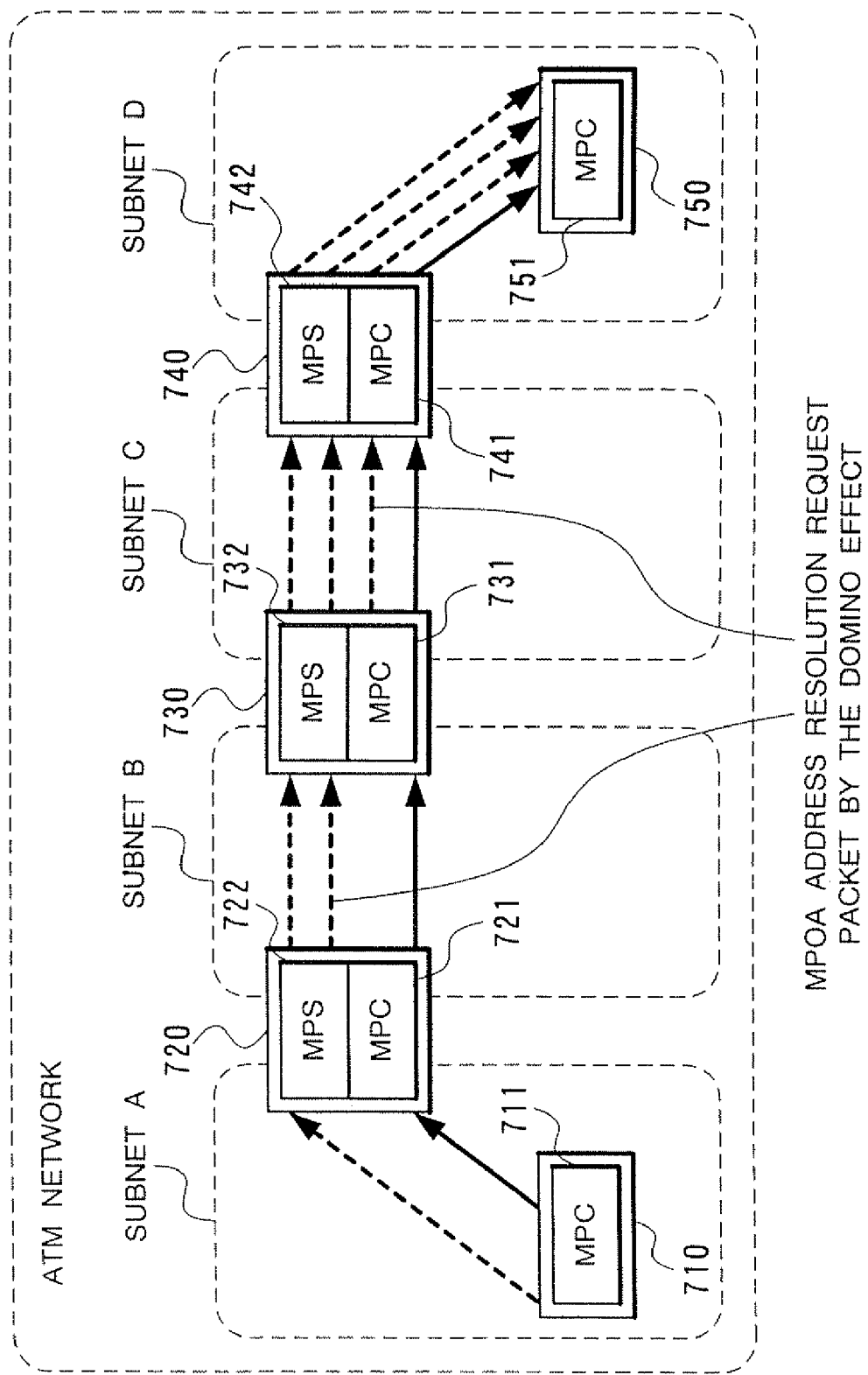
FIG. 14 is a view for use in describing the Domino Effect of the conventional MPOA system.
Figure 15:
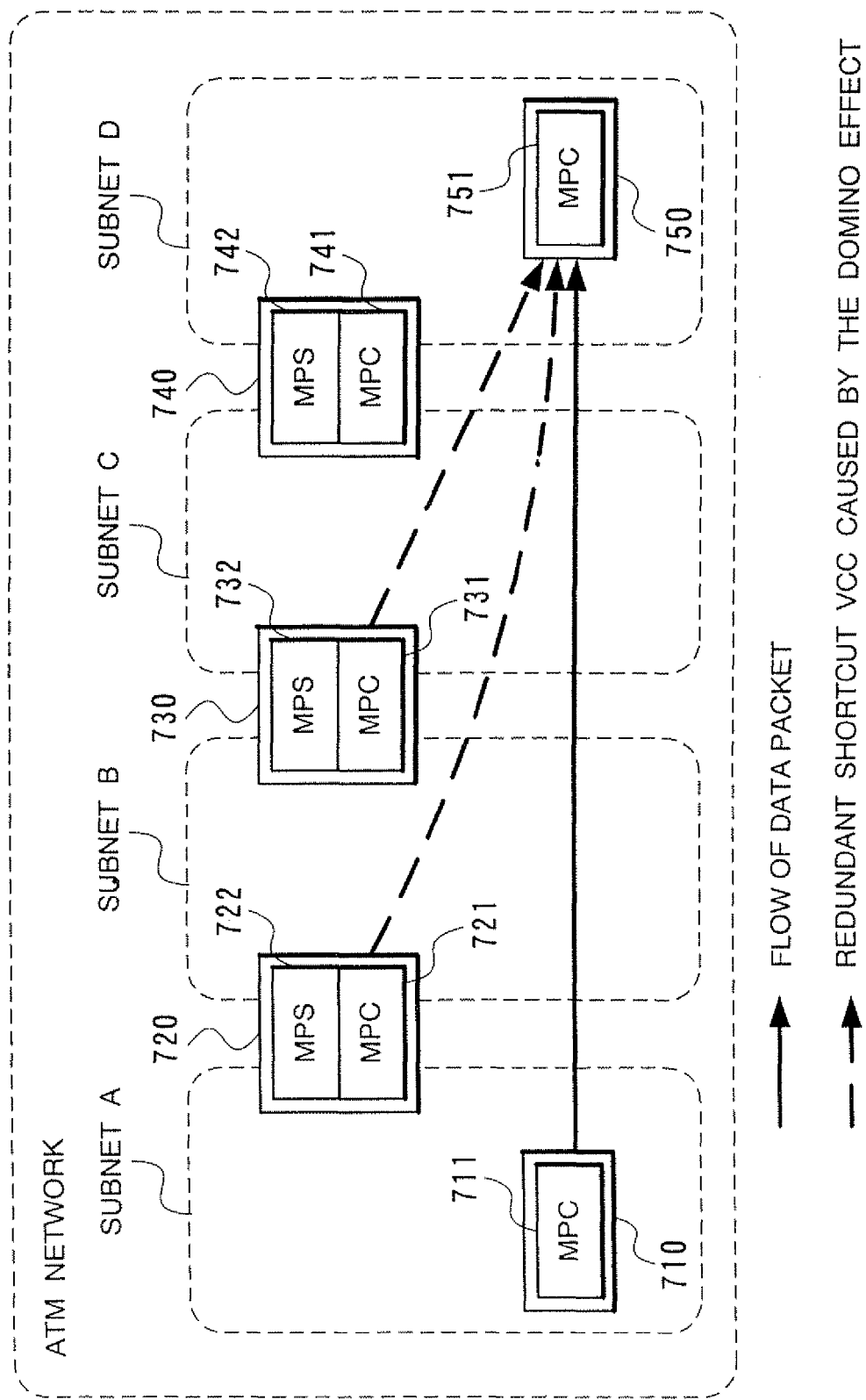
FIG. 15 is a view for use in describing the Domino Effect of the conventional MPOA system.

FIG. 12 is a view showing an example of a format where "the source layer 3 address extension" is newly defined as a normal extension portion of the MPOA, in order to add the source IP address to the MPOA address resolution request packet. Hereinafter, each field in the example of FIG. 12 will be described. The value is decimal, unless otherwise specified.

The value "0" is specified in the C field 40 and the u field 41.

The value for indicating that this extension portion is "source layer 3 address extension" is specified in the Type field 42 (for example, "100F" in hexadecimal).

In the Length field 43, the length from the DSPA Len field 44 to the Data Source Protocol Address field 46 is specified by octet.

In the DSPA Len field 44, the length of the source layer 3 address to be stored in the Data Source Protocol Address field 46 is specified by octet.

The value "0" is specified in the unused field 45.

In the Data Source Protocol Address field 46, the source layer 3 address is specified.

The values and the field names of a packet taken as an example in the above embodiments and examples of the present invention are not restricted to the above, but the other values and names may be used.

It is needless to say that, in the MPOA system of the above embodiments, the functions of the shortcut communication control unit 11, the MPOA packet processing unit 12 for MPC, the source layer 3 address extending unit 13, and the MPOA packet transmitting unit 14 for MPC in the MPC 10, the functions of the MPOA packet receiving unit 21 for MPS, the MPOA packet processing unit 22 for MPS, the management information preserving unit 23, and the MPOA packet transmitting unit 24 for MPS in the MPS 20, and the other functions can be realized by hardware. Further, the MPOA system can be realized by loading a shortcut communication control program that is a computer program having the above functions, into a memory of a computer processor. The shortcut communication control program is stored in storing mediums 80 and 90 such as a magnetic disk, a semiconductor memory, and the like. It is loaded from the storing medium into the computer processor so to control the operation of the computer processor, thereby realizing the above-mentioned functions.

Thus, the present invention can be realized by software, firmware, as well as hardware.

While the preferred embodiments and examples of the present invention have been described, the present invention is not restricted to the above embodiments and examples, but various modifications are possible within the scope and spirit of the invention.

As mentioned above, the MPOA system of the present invention can achieve the following effects.

First, the MPOA system of the present invention can avoid the Domino Effect in the MPOA system. This is because the MPC transmitting an MPOA address resolution request packet adds a source layer 3 address to the extension portion of the MPOA address resolution request packet and therefore the egress MPS can understand the source layer 3 address, thereby to specify each address resolution request from a plurality of nodes for the corresponding source layer 3 address and destination layer 3 address.

Second, the MPOA system of the present invention can be compatible with a communication by the conventional MPOA system which does not have a function of the present invention. This is because the source layer 3 address added to the MPOA address resolution request packet transmitted by the MPC of the MPOA system according to the present invention is added to the extension portion of the MPOA packet and therefore, even if the MPC of the other MPOA system which does not have the function of the present invention receives the MPOA address resolution request packet, there is no problem.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A device comprising:
    a receiver to receive a plurality of resolution request packets from a plurality of communication nodes, respectively, to establish a shortcut virtual channel connection (VCC) from one of the communication nodes to a destination node for a flow of data packets, where each of the plurality of resolution request packets comprises information indicative of a hop count between the respective communication node and the destination node; and
    at least one processor to establish the shortcut VCC between the destination node and one of the plurality of communication nodes most remote from the destination node based on the information indicative of the hop count,
    where each of the plurality of communication nodes and said destination node comprises a client, and each of at least two of the communication nodes comprise a server, and
    where the at least one processor is further to:
        add, in each of said clients, data about layer 3 source address associated with said data packets to a plurality of address resolution request packets that are transmitted from the plurality of communication nodes in the network,
        transmit, in each of said clients, said address resolution packet to one of either the destination node or a next communication node, of the plurality of communication nodes toward said destination node,
        accept, in each of said servers, at least one of said address resolution request packets transmitted,
        when the server is an egress server, detect, in each of said clients, said address resolution request packets according to the data about said layer 3 source address and a layer 3 destination address indicated in said respective address resolution request packets,
        detect, in each of said servers, said address resolution request packet from a client, of the clients, of the one of said plurality of communication nodes most remote from said destination on said network according to hop count values indicated in said address resolution request packets, and
        establish the shortcut VCC in response to validating said detected address resolution request.

2. The device of claim 1, where the at least one processor is further to establish the shortcut VCC only between the destination node and the one of the plurality of communication nodes most remote from the destination node.

3. The device of claim 1, where each of the plurality of resolution request packets comprises information indicative of a network layer source address of the respective communication node.

4. The device of claim 3, where the processor establishes the shortcut VCC based on the information indicative of the network layer source address of the respective communication nodes.

5. The device of claim 4, where the plurality of resolution request packets are multi-protocol over asynchronous transfer mode (MPOA) packets.

6. The device of claim 1, where the at least one processor is further to detect a new flow of data packets and generate a new resolution request packet to establish a new shortcut VCC to a new destination node.

7. The device of claim 1, where the device comprises the destination node.

8. A non-transitory computer-readable medium comprising computer executable instructions executed by at least one processor to perform a method for controlling shortcut communication, the computer-readable medium comprising:
    one or more instructions for adding data about a layer 3 source address associated with a flow of data packets to a plurality of address resolution request packets that are transmitted from a plurality of communication nodes in the network, respectively, to a destination of said flow of data packets in order to establish a shortcut virtual channel connection (VCC) toward said destination of said flow of data packets, and one or more instructions for establishing a shortcut VCC between said destination and one of said plurality of communication nodes most remote from said destination node on said network according to information indicative of hop count values in said address resolution request packets, where each of the plurality of communication nodes and said destination node comprises a client, and each of at least two of the communication nodes comprise a server, and where the computer-readable medium further comprises:
one or more instructions for:
adding, in each of said clients, the data about said layer 3 source address of said data packets to said address resolution request packets, and
transmitting, in each of said clients, said address resolution packet to one of either the destination node or a next communication node, of the plurality of communications nodes, toward said destination node;
one or more instructions for:
accepting, in each of said servers, at least one of said address resolution request packets transmitted, and
when the server is an egress server, detecting, in each of said clients, said address resolution request packets according to the data about said layer 3 source address and a layer 3 destination address indicated in said respective address resolution request packets; and
one or more instructions for:
detecting, in each of said servers, said address resolution request packet from a client, of the clients, of the one of said plurality of communication nodes most remote from said destination on said network according to hop count values indicated in said address resolution request packets, and
establishing the shortcut VCC in response to controlling shortcut communication to validate said detected address resolution request.

9. The non-transitory computer-readable medium as set forth in claim 8, further comprising:
one or more instructions for determining that one of said address resolution request packets is associated with the flow of data packets according to the data about said layer 3 source address and a layer 3 destination address indicated in the one of said address resolution request packets.

10. The non-transitory computer-readable medium as set forth in claim 9, further comprising:
one or more instructions for establishing said shortcut VCC only between said node and the one of said plurality of communication nodes most remote from said destination node.

11. The non-transitory computer-readable medium as set forth in claim 8, further comprising:
one or more instructions for adding the data about said layer 3 source address of said data packets to said address resolution request packet by using a vendor private extension of a multi-protocol over asynchronous transfer mode (MPOA) packet.

12. The non-transitory computer-readable medium as set forth in claim 11, further comprising:
one or more instructions for:
defining a layer 3 source address extension as an extension portion of said MPOA packet, in said address resolution request packet, and
adding the data about said layer 3 source address of said data packets to said address resolution request packet by using said layer 3 source address extension.

* * * * *